United States Patent
Harris

(10) Patent No.: US 8,904,217 B2
(45) Date of Patent: Dec. 2, 2014

(54) SYSTEM AND METHOD FOR MANAGING POWER CONSUMPTION IN A COMPUTER DEVICE

(75) Inventor: Brandon Harris, San Jose, CA (US)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 13/487,093

(22) Filed: Jun. 1, 2012

(65) Prior Publication Data

US 2013/0238920 A1 Sep. 12, 2013

Related U.S. Application Data

(60) Provisional application No. 61/609,241, filed on Mar. 9, 2012.

(51) Int. Cl.
*G06F 1/26* (2006.01)
*G06F 1/32* (2006.01)

(52) U.S. Cl.
USPC ........... 713/323; 713/100; 713/300; 713/321; 713/503

(58) Field of Classification Search
CPC ...................................................... G06F 1/266
USPC .......................... 713/100, 300, 321, 503, 323
See application file for complete search history.

(56) References Cited

U.S. PATENT DOCUMENTS

| | | | | |
|---|---|---|---|---|
| 7,155,622 B2 * | 12/2006 | Mancey et al. | | 713/324 |
| 7,203,849 B2 * | 4/2007 | Dove | | 713/300 |
| 2002/0052706 A1 | 5/2002 | Odaohhara et al. | | |
| 2006/0053324 A1 * | 3/2006 | Giat et al. | | 713/300 |
| 2006/0248359 A1 | 11/2006 | Fung | | |
| 2007/0136614 A1 * | 6/2007 | Heath et al. | | 713/300 |
| 2007/0277049 A1 * | 11/2007 | Hansalia | | 713/321 |
| 2009/0055672 A1 * | 2/2009 | Burkland et al. | | 713/340 |
| 2009/0089562 A1 | 4/2009 | Schuchman et al. | | |
| 2010/0164736 A1 | 7/2010 | Byers et al. | | |
| 2010/0201308 A1 * | 8/2010 | Lindholm | | 320/107 |
| 2010/0219790 A1 * | 9/2010 | Chadbourne et al. | | 320/107 |
| 2010/0292854 A1 | 11/2010 | Burg et al. | | |
| 2011/0197081 A1 * | 8/2011 | Dove | | 713/310 |
| 2011/0314201 A1 * | 12/2011 | Su et al. | | 710/316 |
| 2012/0078690 A1 * | 3/2012 | Harriman et al. | | 705/14.4 |
| 2012/0173910 A1 * | 7/2012 | Ballantyne et al. | | 713/340 |
| 2012/0239945 A1 * | 9/2012 | Balasubramanian et al. | | 713/300 |
| 2012/0246458 A1 * | 9/2012 | Jain et al. | | 713/100 |
| 2012/0311355 A1 * | 12/2012 | Hansalia et al. | | 713/300 |
| 2012/0331315 A1 * | 12/2012 | Diab | | 713/310 |
| 2013/0069600 A1 * | 3/2013 | Knowlton et al. | | 320/162 |
| 2013/0073758 A1 * | 3/2013 | Chang et al. | | 710/106 |
| 2013/0154551 A1 * | 6/2013 | Jeansonne et al. | | 320/107 |

FOREIGN PATENT DOCUMENTS

WO 2013/134531 A1 9/2013

OTHER PUBLICATIONS

"Battery Charging Specification—Revision 1.2", USB Implementers Forum, Inc., Dec. 7, 2010.
"USB Charging Port Power Switch and Controller", Texas Instruments, Oct. 2011, retrieved from <http://focus.ti.com/lit/ds/symlink/tps2540>.

* cited by examiner

*Primary Examiner* — Vincent Tran

(57) ABSTRACT

A system and method is disclosed for managing power consumption in a computing device. A policy controller determines whether an aggregated power consumption of a plurality of external interface controllers in a computing device is greater than a policy power limit. On determining that the aggregated power consumption is greater than the policy power limit, the policy controller may set a first external interface controller at a negotiated power level, and set a second external interface controller at an adjusted power level, wherein the first external interface controller and the second external interface controller are set based on the policy power limit and the aggregated power consumption.

20 Claims, 5 Drawing Sheets

SYSTEM AND METHOD FOR MANAGING POWER CONSUMPTION IN A COMPUTER DEVICE

CROSS-REFERENCE TO RELATED APPLICATIONS

The present application claims the benefit of priority under 35 U.S.C. §119 from U.S. Provisional Patent Application Ser. No. 61/609,241 entitled "System and Method for Managing Power Consumption in a Computer Device," filed on Mar. 9, 2012, the disclosure of which is hereby incorporated by reference in its entirety for all purposes.

TECHNICAL FIELD

The subject technology relates generally to power management of computer systems.

BACKGROUND

Modern computers may include multiple Universal Serial Bus (USB) ports used for data transmission and/or charging of mobile devices. Traditional USB ports are capable of providing up to about 2.5 watts of power, while standards for higher power USB ports have increased to about 7.5 watts. However, a typical computer power supply may only provide about 65 watts, with around 15 watts drawn by the computer or laptop itself. In devices with smaller power supplies and a large number of USB ports (for example, 6 or more), management of power consumption by multiple connected devices may become problematic, especially when the device is temporarily powered by a battery.

SUMMARY

The subject technology provides a system and method for managing power in a computer device. According to one aspect, the system may include a plurality of external interface controllers, each external interface controller operable to switch between a low power mode and a high power mode, and including a power level indicator configured to produce a signal representative of a negotiated power level of the external interface controller. A policy controller may be operably connected to the plurality of external interface controllers. On receiving a signal representative of a negotiated power level from a first external interface controller of the plurality of interface controllers, the policy controller is configured to determine an aggregated power consumption of the plurality of external interface controllers, and, if the aggregated power consumption is greater than a policy power limit, set the first external interface controller at the negotiated power level of the first external interface controller, and set a second external interface controller at an adjusted power level, wherein the first external interface controller and the second external interface controller are set based on the policy power limit and the aggregated power consumption.

In another aspect, a computer-implemented method may include determining an aggregated power consumption of a plurality of external interface controllers in a computing device, and, on determining the aggregated power consumption is greater than a policy power limit, setting a first external interface controller at a negotiated power level, and setting a second external interface controller at an adjusted power level, wherein the first external interface controller and the second external interface controller are set based on the policy power limit and the aggregated power consumption.

In a further aspect, a method may be performed by a machine-readable medium having machine-executable instructions stored thereon. The instructions, when executed, may perform a method that includes receiving a negotiated power level from a first USB charging port power switch controllers (CPPSC) of a plurality of CPPSCs in a computing device, determining an aggregated power consumption of the plurality of CPPSCs, and setting the power level for each of the plurality of CPPSCs based on a policy power limit and the determined aggregated power consumption.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The subject technology provides an apparatus and system for managing power supplied to a plurality of peripheral devices (for example, USB devices) in a computing device. In one aspect, the system may include a plurality of USB charging port power switch controllers (CPPSC) and a USB policy controller. Each CPPSC may handle negotiation with a USB device and may be switched between various charge modes, including Dedicated Charging Port mode, Standard Downstream Port mode, Charging Downstream Port mode, and offline. In some aspects, the charging modes may be switched without disconnecting a device that is attached (for example, by a wired or wireless link) and operably connected (for example, ready to communicate) to a respective port. Each CPPSC may report to the USB policy controller as to whether an attached and/or connected USB device has negotiated a high power charge or attempted to draw more than a predetermined amount of current. In this regard, the policy controller may monitor connected CPPSCs to ensure that the total power drawn does not exceed a power limit.

Figure 1:
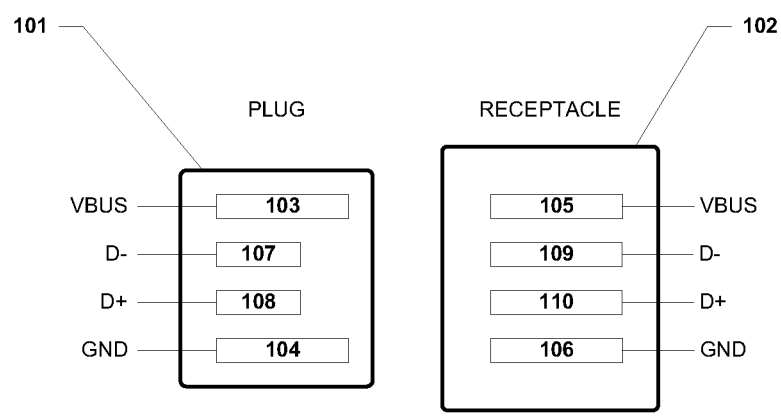
FIG. 1 is a diagram of an example USB plug and receptacle according to one aspect of the subject technology.

FIG. 1 is a diagram of an example USB plug and receptacle according to one aspect of the subject technology. A USB plug 101 and receptacle 102 may be configured such that when plug 101 is inserted into receptacle 102, plug power pin 103 (VBUS) and plug ground pin 104 (GND) make contact with receptacle power pin 105 (VBUS) and receptacle ground pin 106 (GND), respectively. Likewise, plug data pins D− 107 and D+ 108 make contact with receptacle data pins D− 109 and D+ 110, respectively. Plug 101 or receptacle 102 may be representative of a USB port in a computing device (for example, a desktop or notebook computer, tablet, smart phone, PDA, camera, or the like). To transmit data between two devices, a USB connection may be made between a host or hub "downstream" port at one end, and a device "upstream" port at the other end. In some aspects, data signals may be transmitted using half-duplex differential signaling over a twisted-pair data cable attached between plug data pins D− 107 and D+ 108 and receptacle data pins D− 109 and D+ 110, respectively. In other aspects, full duplex signaling, for a higher data bandwidth, may be achieved by the addition of one or more additional pairs of twisted wire and respective pin contacts.

When no upstream device is connected (for example, ready to communicate), both data lines are pulled low, indicating a reset or disconnected connection. When connected, a USB device may be configured to pull one of the data lines high to place the data lines in an idle state. A device may advertise or negotiate for bandwidth by manipulating the voltage on a selected data line. For example, a full-bandwidth device may pull D+ high, while a low-bandwidth device may pull D− high. Serial data may be transmitted by toggling the data lines. USB may encode data using the NRZI convention. For example, a 0 bit may be transmitted by toggling the data lines, while a 1 bit may be transmitted by leaving the data lines in the idle state.

For the purpose of this disclosure, a downstream port is considered to be "attached" to an upstream port of a downstream peripheral device when, for example, plug power pin 103 (VBUS) and plug ground pin 104 make contact with receptacle power pin 105 and receptacle ground pin 106, respectively. A downstream peripheral device may be considered to be "connected" to the downstream port when the ports are attached and the downstream peripheral device has pulled either data line D− or D+ high, signaling that the device is ready to communicate. In some aspects, a USB port may include one or more extra power pins to supply extra power. For example, a device may include four additional pins to supply up to 6 A at either 5 V, 12 V, or 24 V to peripheral devices.

Figure 2:
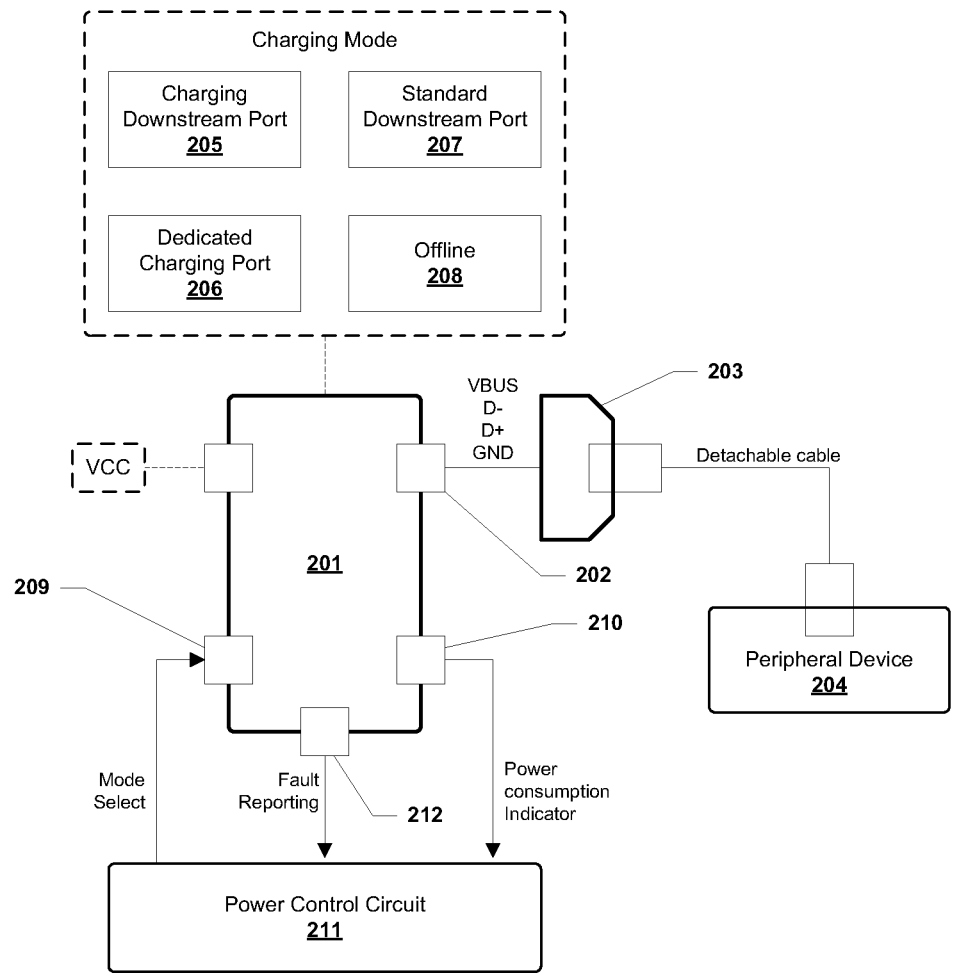
FIG. 2 is a diagram of an example external interface controller, including a mode select and power consumption indicator pin, according to one aspect of the subject technology.

FIG. 2 is a diagram of an example external interface controller 201, including a mode select pin 209 and power consumption indicator pin 210, according to one aspect of the subject technology. External interface controller 201 may operate as a USB charging port power switch controller (CPPSC). External interface controller 201 may include input/output (I/O) connection data and power pins 202 that, in conjunction with a data connector 203 (for example, a USB plug 101 or receptacle 102), function as an external port for interfacing with a peripheral device 204. When attached to peripheral device 204 (for example, over a detachable cable), interface controller 201 may be configured to facilitate a negotiation of bandwidth or power requirements. For example, pins 202 (for example, D− 109 and D+ 110 of FIG. 1) may be used to perform a handshake between device 204 and interface controller 201, and facilitate a request by device 204 for low or high bandwidth communication, or a certain amount of power consumption.

On a successful negotiation, interface controller 201 may be configured to switch between charging modes to accommodate the power requirements of peripheral device 204. For example, interface controller 201 may be configured to function as a Charging Downstream Port (CDP) 205, Dedicated Charging Port (DCP) 206, Standard Downstream Port (SDP) 207, or offline 208. Interface controller 201 may include one or more mode selection pins 209 for selecting between these charging modes. The charging mode of interface controller 201 may be selected, for example, by placing a binary value (for example, 00, 01, 10, 11) at mode selection pins 209 (for example, using a data bus connected to the pins), each binary value representative of a charging mode.

In one example, when interface controller 201 is configured to operate as a CDP, interface controller 201 may supply a maximum of 1.5 A to peripheral device 204 when communicating at low-bandwidth or full-bandwidth, a maximum of 900 mA when communicating at high-bandwidth, and as much current as connector 203 will safely handle when no communication is taking place. In some examples, the current available to peripheral device 204 may be limited to 1.5 A by default. In this regard, interface controller 201 may be configured to output a voltage on its D− line when attached but not connected to a peripheral device 204, and when it senses a predetermined voltage (or range of voltage) on its D+ line. Interface controller 201 may not output a voltage on its D− line while peripheral device 204 is connected.

When interface controller 201 is configured to operate as a DCP, interface controller 201 may supply a maximum current (for example, 1.8 A of current at 5.25 V) to peripheral device 204. Interface controller 201 may be configured to advertise its status as a DCP by shorting the D+ and D− pins of connector 203. In this regard, the short may disable data transfer, but enable peripheral device 204 to detect the DCP mode by detecting the short.

When interface controller 201 is configured to operate as a SDP, interface controller 201 may, for example, supply 2.5 mA when peripheral device 204 is not connected (for example, not ready to communicate) or the connection has been suspended (for example, for lack of activity), or up to 100 mA when connected and not suspended. Peripheral device 204 may connect in low power mode (100 mA) and then negotiate for up to 500 mA. Accordingly, interface controller 201 may then be configured to provide up to 500 mA while connected to peripheral device 204. Interface controller 201 may be configured to advertise its status as a SDP by pulling the D+ and D− pins of connector 203 to ground.

Interface controller 201 may include one or more power consumption indicator pins 210 for indicating to a power control circuit 211 that an attached peripheral device 203 has negotiated a high power charge (for example, greater than 1.0 amps in a DCP mode or CDP mode). Mode selection pins 209 may be bi-directional. In this regard, interface controller 201 may indicate to power control circuit 211 via power consumption indicator pins 210 that the high power charge has been requested, along with one or more signals representative of a requested charging mode (for example, DCP mode) placed on the data bus via selection pins 209. Power control circuit 211 may then confirm the selection or set interface controller 201 to a different charging mode using selection pins 209.

Interface controller 201 may further include a fault reporting pin 212 for reporting when the connected peripheral device 204 has attempted to draw more than a predetermined amount of current (for example, more than 100 mA when configured to operate as a SDP). In this regard, if interface controller 201 is set to a first charging mode but peripheral device 204 attempts to draw more current than the charging mode allows then interface controller 201 may change a value of fault reporting pin 212 (for example, from a logical low to a logical high). A decision may then be made by power control circuit 211 to change the charging mode via selection pins 209, including, for example, switching interface controller 201 from operating as a SDP to operating as a CDP. In some aspects, the charging modes may be switched while maintaining a current device connection to a device connected at the respective port.

Figure 3:
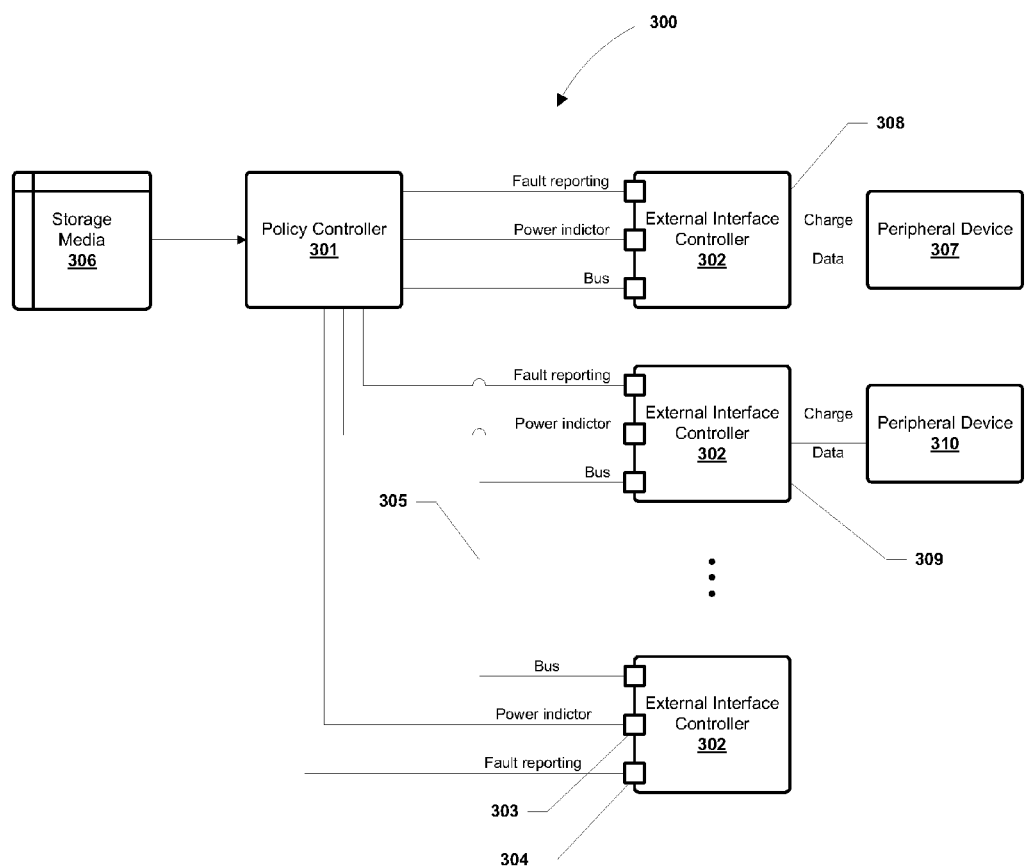
FIG. 3 is a diagram of an example system for managing peripheral power in a computer device, including a policy controller and a plurality of external interface controllers, according to one aspect of the subject technology.

FIG. 3 is a diagram of an example system 300 for managing peripheral power in a computing device, including a policy controller 301 and a plurality of external interface controllers 302, according to one aspect of the subject technology. Policy controller 301 may be operably connected to multiple external interface controllers 302 (for example, external interface controllers 201), each including a respective power indicator pin 303 (for example, power consumption indicator pin 210) and fault reporting pin 304 (for example, fault reporting pin 212). In one aspect, policy controller 301 may issue commands to a bus 305 to control external interface controllers 302 (for example, via one or more mode selection pins 209). In another aspect, policy controller 301 may be configured to control total system power.

Figure 5:
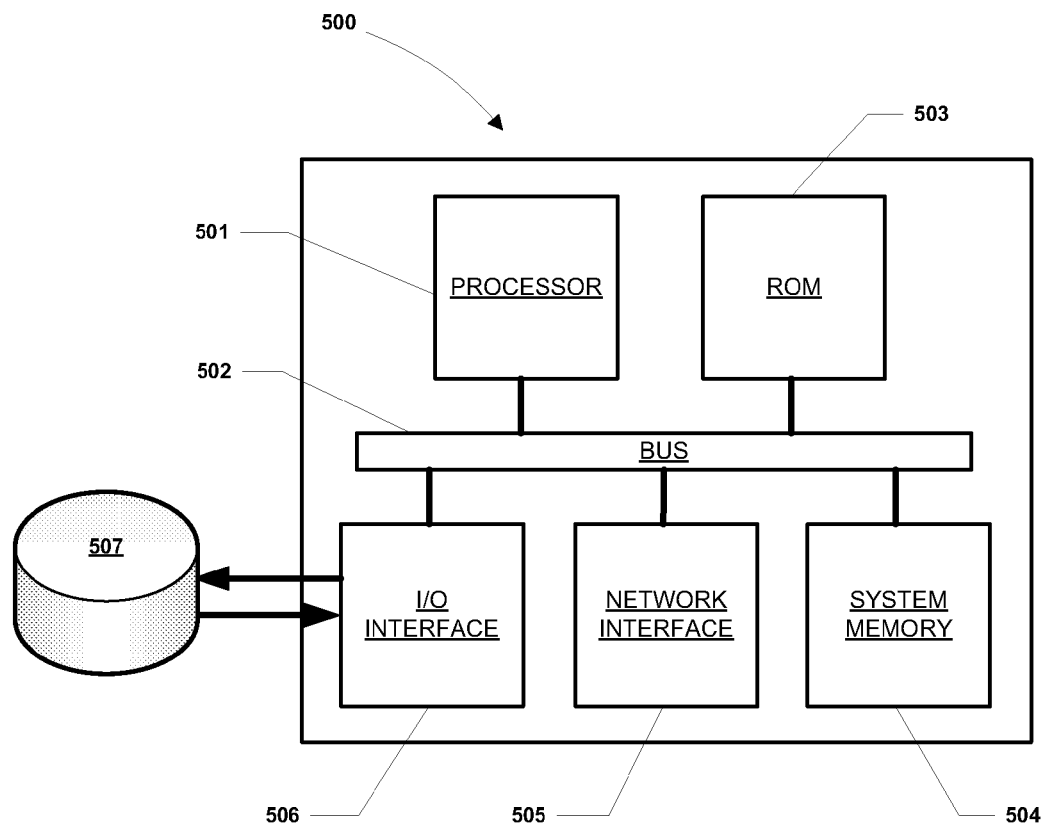
FIG. 5 is a diagram illustrating an example device for managing peripheral power in a computer device, including a processor and other internal components, according to one aspect of the subject technology.

In one aspect, policy controller 301 may be a hardware controller, for example, a general-purpose microprocessor, microcontroller, or the like, within a computing device (for example, computing device 500 of FIG. 5). Policy controller 301 may be configured to execute one or more sequences of instructions or software from a storage media 306 (for example, ROM 503 or system memory 504 of FIG. 5) located within the computing device. Software 306, when executed by policy controller 301, may configure policy controller 301 to operate and/or monitor the aggregated power negotiated by the plurality of external interface controllers 302 of system 300. In one example, policy controller 301 may be configured to monitor external interface controllers 302 and determine whether an aggregated power supplied by the plurality of external interface controllers 302 is greater than a predetermined power limit (for example, 45-50 watts). In one example, a first peripheral device 307 attached to a first external interface controller 302 may negotiate a high power consumption (for example, over 500 mA). On determining that the negotiated power would exceed the predetermined power limit, policy controller 301 may set the first external interface controller at the negotiated power level, and then set a second external interface controller 309 (for example, connected to a second peripheral device 310) at an adjusted power level. The adjusted power level may be a lower power consumption such that the aggregated power of the plurality of external interface controllers 302 is below or does not exceed the predetermined power limit.

All external interface controllers 302 may initially be set to advertise a high power charge capability. In this regard, a first high powered device (for example, peripheral device 307) may be able to be attached to an external interface controller 302 and negotiate and receive the power that it needs to operate. If a second high powered device (for example, peripheral device 310) is later attached to the system and brings the total system power to or beyond a power limit then policy controller 301 may selectively disable the remaining external interface controllers 302 from advertising high power charge capability.

In one example, a portable external hard drive (not shown) may be connected to a USB port of an external interface controller 302. The USB port may be initially set to a Standard Downstream Port, having a maximum current limit of 500 mA. The external hard drive may attempt to negotiate a current of more than 500 mA. An overcurrent fault signal may then be sent to the policy controller via the fault reporting pin 304 of the corresponding external interface controller 302.

The fault signal may trigger policy controller 301 to compare current negotiated from devices connected to other external interface controllers 302 (for example, via their indicator pins) to determine whether the current power consumption policy limit will allow the proposed increase in power, or whether power to another device should be reduced to limit overall power consumption.

In some aspects, policy controller 301 may be configured to assign a higher or lower charging priority to predetermined types of peripherals to designate some types of peripherals that may be switched off when other more important types of peripherals require charging. For example, if an external hard drive is determined to have a high charging priority, the USB port connected to the hard drive may increase its power by being switched from a Standard Downstream Port to a Charging Downstream Port, while a USB port connected to a smart phone, having lower priority, may be switched from a Charging Downstream Port to a Standard Downstream Port.

Figure 4:
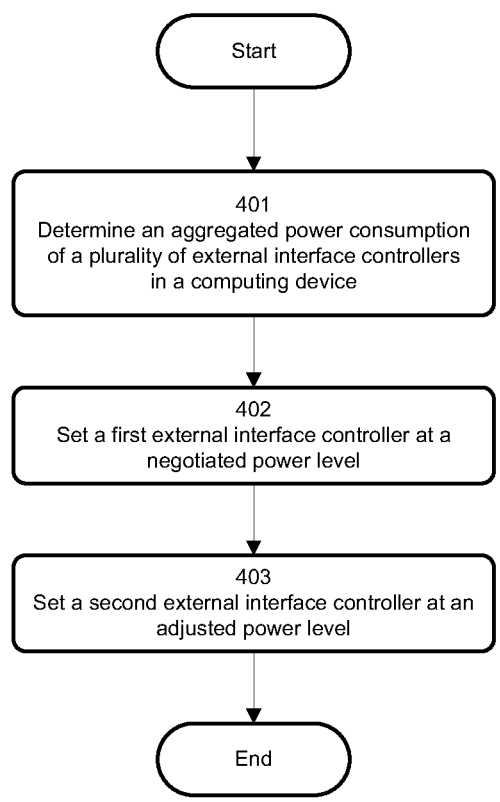
FIG. 4 is a flowchart illustrating an example process for managing peripheral power in a computer device according to one aspect of the subject technology.

FIG. 4 is a flowchart illustrating an example process for managing peripheral power in a computing device according to one aspect of the subject technology. A computing device may be configured with a policy controller (for example, policy controller 301) to manage the overall power consumption of a plurality of peripheral devices connected to a plurality of respective ports (for example, USB ports). In step 401, the policy controller determines an aggregated power consumption of a plurality of external interface controllers in a computing device. On determining the aggregated power consumption is greater than a policy power limit, in step 402, a first external interface controller is set (for example, by the policy controller) at a negotiated power level. And, in step 403, a second external interface controller is set at an adjusted power level. Accordingly, the first external interface controller and the second external interface controller are set based on the policy power limit and a total power consumption of the plurality of external interface controllers.

FIG. 5 is a diagram illustrating an example device for managing peripheral power in a computing device, including a processor and other internal components, according to one aspect of the subject technology. In some aspects, a computing device 500 includes several internal components such as a processor 501, a system bus 502, read-only memory 503, system memory 504, network interface 505, I/O interface 506, and the like. In one aspect, processor 501 (for example, policy controller 301) may also be communication with one or more peripheral devices 507 (for example, peripheral device 204, 307 or 310) via I/O interface 506 (for example, external interface controller 201 or 302). In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 may be configured to monitor and control the operation of the components in computing device 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 505, ROM 503, or received from a storage medium associated with a peripheral device 507 (for example, a USB storage device). ROM 503, system memory 505, and storage medium of device 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 may be configured to communicate with one or more peripheral devices 507 (for example, peripheral device 204) via I/O interface 506. Processor 501 may be configured, for example, by software, as a power policy control circuit. In this regard, processor may execute instructions that cause processor 501 to monitor and control power consumption and/or data bandwidth of I/O interfaces 506. Processor 501 may be further configured to read data stored in system memory 504 and/or storage medium of device 507 and to transfer the read data to the one or more external devices in response to a request from the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage computing device 500 and/or one or more peripheral devices 507 (for example, to manage overall power consumption of attached devices 507). According to one aspect of the subject technology, system memory 504 may be random access memory (RAM) such as double data rate (DDR) RAM. Other types of RAM also may be used to implement system memory 504. Memory 504 may be implemented using a single RAM module or multiple RAM modules. While system memory 504 may be depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 may be configured to communicate data, addresses, and control signals between the internal components attached to bus 502 (for example, processor 501) and one or more external devices (for example, a hard drive). I/O interface 506 may be configured to implement a standard interface, such as USB, Serial-Attached SCSI (SAS), Fiber Channel interface, PCI Express (PCIe), SATA, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for managing power in a computing device, comprising:
    a plurality of external interface controllers, each external interface controller operable to switch between a low power mode and a high power mode, and each external interface controller including a power level indicator configured to produce a signal representative of a negotiated power level of the respective external interface controller;
    a policy controller operably connected to the plurality of external interface controllers, wherein, on receiving a signal representative of a negotiated power level from a first external interface controller of the plurality of interface controllers, the policy controller is configured to:
        determine an aggregated power consumption based on a power measurement from each of the plurality of external interface controllers; and
        if the aggregated power consumption is greater than a policy power limit, set the first external interface controller at the negotiated power level of the first external interface controller, and
        set a second external interface controller at an adjusted power level below a negotiated power level of the second external interface controller and a non-zero power level of the second external interface controller, wherein the first external interface controller and the second external interface controller are set based on the policy power limit and the aggregated power consumption.

2. The system of claim 1, wherein the external interface controllers include USB charging port power switch controllers, each power switch controller associated with a power level indicator, wherein the signal is received from the power level indicator associated with the first external interface controller.

3. The system of claim 1, wherein the policy controller is further configured to determining a device connected to the first external interface controller has a higher priority than a device connected to the second external interface controller before setting the first external interface controller at the negotiated power level.

4. The system of claim 1, wherein the policy controller is a microprocessor executing machine-executable instructions.

5. The system of claim 1, wherein one or more of the plurality of external interface controllers is configured to switch between a dedicated charging mode, standard downstream mode, charging downstream mode, and offline.

6. The system of claim 5, wherein the one or more of the plurality of external interface controllers is configured to switch to the charging mode while maintaining a device connection to a device connected to the one or more of the plurality of interface controllers.

7. The system of claim 1, wherein each of the plurality of external interface controllers includes a fault reporting indicator configured to report to the policy controller whether a connected device has attempted to draw more than a predetermined amount of current.

8. The system of claim 1, wherein the policy controller is connected to the plurality of external interface controllers by a bus, and wherein the policy controller is configured to issue commands over the bus to one or more mode select pins associated with the external interface controllers to control the aggregated power consumption.

9. The system of claim 1, wherein the plurality of external interface controllers are configured to be initially set to advertise the high power mode on a power-on or reset of the external interface controller.

10. The system of claim 1, wherein the policy controller is configured to, on determining that the aggregated power consumption of the plurality of external interface controllers is greater than the policy power limit, disable unused external interface controllers from advertising high power charge capability.

11. A computer-implemented method for managing power in a computing device, the method comprising:
    determining an aggregated power consumption based on a power measurement from each of a plurality of external interface controllers in a computing device, each external interface controller including a power level indicator configured to produce a signal representative of a negotiated power level of the respective external interface controller; and
    on determining the aggregated power consumption is greater than a policy power limit,
        setting a first external interface controller at a negotiated power level of the first external interface controller, and
        setting a second external interface controller at an adjusted power level below a negotiated power level of the second external interface controller and a non-zero power level of the second external interface controller, wherein the first external interface controller and the second external interface controller are set based on the policy power limit and the aggregated power consumption.

12. The computer-implemented method of claim 11, further comprising:
    receiving a signal representative of a negotiated power level from a power level indicator of the first external interface controller before determining the aggregated power consumption.

13. The computer-implemented method of claim 11, wherein determining the aggregated power consumption comprises:
    receiving, from each of the plurality of external interface controllers, a signal representative of a power supplied by the external interface controller.

14. The computer-implemented method of claim 11, further comprising:
   determining a device connected to the first external interface controller has a higher priority than a device connected to the second external interface controller before setting the first external interface controller at the negotiated power level.

15. The computer-implemented method of claim 11, wherein setting the second external interface controller at the adjusted power level includes:
   switching the second external interface controller from a first charging mode to a second charging mode in a group of charging modes consisting of a dedicated charging port mode, standard downstream port mode, charging downstream port mode, and offline mode.

16. The computer-implemented method of claim 15, further comprising:
   switching a charging mode of the second external interface controller while maintaining a device connection to a device connected to the second external interface controller.

17. The computer-implemented method of claim 11, further comprising:
   on determining that the aggregated power consumption of the plurality of external interface controllers is greater than the policy power limit, disabling unused external interface controllers from advertising high power charge capability.

18. A non-transitory machine-readable medium having machine-executable instructions stored thereon that, when executed, perform a method, comprising:
   receiving a negotiated power level from a first USB charging port power switch controller (CPPSC) of a plurality of CPPSCs in a computing device, each CPPSC including a power level indicator configured to produce a signal representative of a negotiated power level of the respective CPPSC;
   determining an aggregated power consumption based on a power measurement from each of the plurality of CPPSCs; and
   setting the power level for each of the plurality of CPPSCs below the respective negotiated power level of each of the plurality of CPPSCs based on a policy power limit and the determined aggregated power consumption such that the aggregated power consumption is below the policy power limit.

19. The non-transitory machine-readable medium of claim 18, the method further comprising:
   if the determined aggregated power consumption is greater than the policy power limit, setting the first CPPSC to supply a first charge to the first device at the negotiated power level; and
   setting a second CPPSC to supply a second charge to the second device at an adjusted power level below the negotiated power level of the second external interface controller and a non-zero power level of the second external interface controller.

20. The non-transitory machine-readable medium of claim 19, wherein setting the second CPPSC at the adjusted power level includes:
   switching the second CPPSC from a first to a second charging mode in a group of charging modes consisting of a dedicated charging port mode, standard downstream port mode, charging downstream port mode, and offline mode.

* * * * *